Sept. 13, 1966 C. J. NAUTA 3,272,481
MIXING DEVICES
Filed July 7, 1964 2 Sheets-Sheet 1
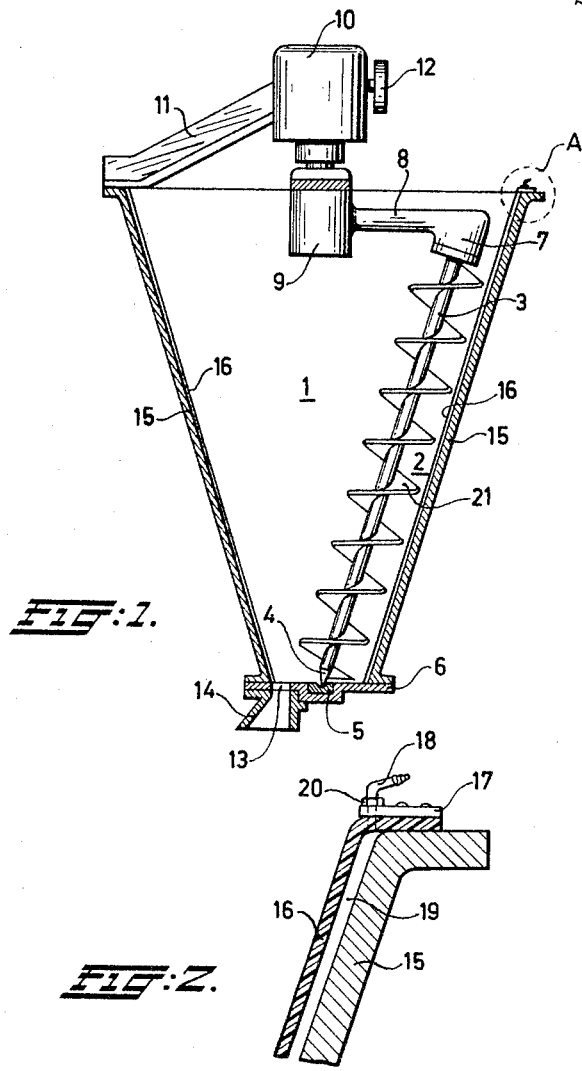
FIG:1.
FIG:2.
INVENTOR.
CONSTANT J Nauta Sept. 13, 1966 C. J. NAUTA 3,272,481
MIXING DEVICES Filed July 7, 1964 2 Sheets-Sheet 2

INVENTOR.
CONSTANT J NAUTA

United States Patent Office 3,272,481
Patented Sept. 13, 1966

3,272,481
MIXING DEVICES
Constant J. Nauta, Bloemendaal, Netherlands, assignor to Nautamix N.V., Haarlem, Netherlands
Filed July 7, 1964, Ser. No. 380,830
Claims priority, application Netherlands, July 12, 1963, 295,226; Apr. 9, 1964, 6,403,850
4 Claims. (Cl. 259—111)

This invention relates to new and useful improvements in mixing devices of the kind with one or more mixing vessels each with a side wall of circular cross-section and a bottom, one or more mixing elements disposed in each vessel and each having its longitudinal axis extending parallel to the side wall of the corresponding vessel, each mixing element being mounted, at its lower end, in said bottom of the vessel and, at its upper end, in a driving mechanism for revolving about the longitudinal axis of said vessel in close proximity to the vessel wall, and means for effecting revolving of said mixing element about said longitudinal axis of the vessel.

Known devices of this kind all have a disadvantageous characteristic, namely that, in operation, a solid crust is formed on the inside wall of each mixing vessel, which crust consists of particles of the materials to be mixed and impurities, if any, that may enter the mixing vessel. The manual removal of this encrusted layer is laborious and time consuming, so that cleaning of the mixing vessel or vessels requires that the device be out of use for a considerable time.

An object of the invention is to provide, in mixing devices of the kind described a special arrangement whereby this disadvantage is eliminated by enabling the mixing device itself to remove the encrusted layer from the inside surface of the vessel wall. To this end, according to the invention, each mixing vessel has a wall comprising a closed rigid outer casing and a closed elastic inner casing joined to the outer casing in a fluid-tight manner at the upper and lower edges of the casings, and at least one valved port opens between the rigid outer casing and the elastic inner casing.

Thus, through the valved port, the pressure between the rigid outer casing and the elastic inner casing can be controlled so that, when the mixing device is in operation, the elastic inner casing can be kept free from the circumferential surface of the mixing element or elements revolving in the mixing vessel and, when it is desired to remove the encrusted layer on this inner casing it can be moved into close proximity with the mixing element or elements or even forced into engagement therewith.

The invention will be described in detail with reference to the drawings which diagrammatically show two embodiments of the invention.

FIGURE 1 is a longitudinal axial section of a mixing device.

FIGURE 2 is an enlarged sectional view showing details of the region indicated at A on FIGURE 1.

FIGURE 3 is a longitudinal axial section of a second embodiment of the mixing device.

Figure 5:
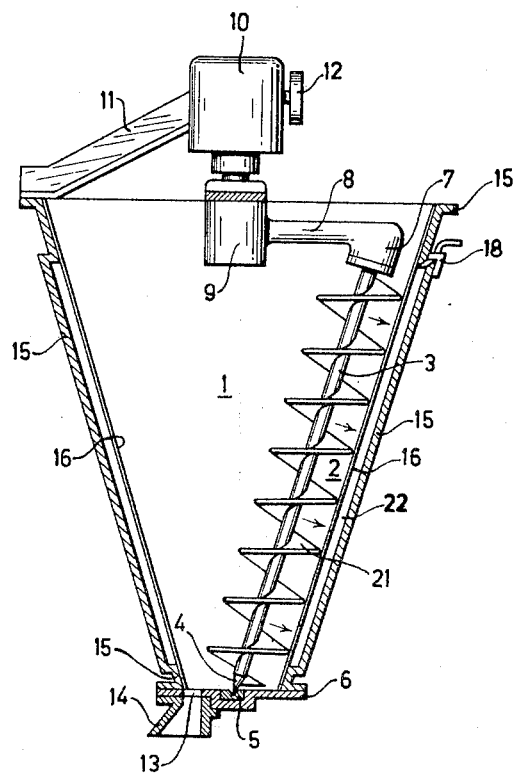

In both embodiments shown in the drawings, the same reference numbers are used to identify the corresponding elements of each device. As shown, the mixing vessel 1 of the mixing device has a circular cross-section tapering in the downward direction. The mixing vessel is provided with a single mixing screw 2 adapted to rotate about its own longitudinal axis while simultaneously revolving about the vessel axis. The mixing screw 2 has a shaft 3 with a pin 4 at its lower end seated in a footstep bearing 5 arranged in the flat bottom 6 of the mixing vessel 1 concentrically with the latter. At the upper end, the shaft 3 of the mixing screw is mounted rotatably in the head 7 at the outer end of a retaining arm 8 which extends radially from a sleeve 9 arranged concentrically in said mixing vessel 1. This sleeve 9 is supported by a driving gear 10 which in turn is suspended from a bar 11 arranged at the top of the mixing vessel and extending, for example, from the wall of the mixing vessel. The driving gear 10 is provided with a driving pulley 12. The driving gear, the details of which do not relate in any way to the invention, is arranged so that, when the driving gear 10 is operated by driving the pulley 12, the mixing screw 2 is revolved about the axis of the mixing vessel 1 and, at the same time, is rotated about the axis of its shaft 3. The bottom 6 has a discharge opening 13 which corresponds with an outlet 14 that may be provided with a closing device, not shown.

In accordance with this invention, the wall of the mixing vessel 1 comprises a closed rigid outer casing 15, for example, of a metal, and a closed elastic inner casing 16, for example, of rubber, a plastic material or the like. These casings 15 and 16 are joined to each other in a fluid-tight manner at their upper and lower edges. In one embodiment (FIGURES 1 and 2) the elastic inner casing 16 is provided at its upper edge with a metal rim 17 riveted to a flange at the upper edge of casing 15. A valved nipple or port 18 is screwed through rim 17 to open into the space 19 between casings 15 and 16. It is obvious that the valved nipple 17 is illustrated diagrammatically only and that, through such valved nipple or port air or other gaseous or liquid mediums can be pumped into the space 19 with a predetermined pressure greater than atmospheric pressure so that the elastic inner casing 16 is moved towards the helical blade 21 of the mixing screw 2. In the second embodiment (FIGURE 3) the rigid outer casing 15 has an outwardly offset portion 22 extending entirely about the circumference of the mixing vessel 1. The height and width of this offset portion 22 must be adapted to the type of the mixing device in question. The valved nipple or port 18 opens into the space defined between the offset portion 22 and inner casing 16 so that when this valved port is open to cause the pressure inside said space to be equal to the atmospheric pressure, the elastic inner casing 16 is stretched in close proximity to the helical blade 21 of the mixing screw 2 enabling this helical blade 21 to remove the encrusted layer from the inside surface of the wall of the mixing vessel. In normal operation the space defined by offset portion 22 is evacuated or connected to a source of vacuum whereby the elastic inner casing 16 is displaced outwardly away from the mixing screw 2.

It is obvious that in both embodiments described above, the movement of the elastic inner casing towards the mixing element may take place gradually while said mixing element is operated at the same time to remove gradually the encrusted layer on the inside of said elastic inner casing. Usually the removal of said encrusted layer is effected while the mixing element rotates in an empty mixing vessel, so that the total driving power is available for effecting the cleaning action.

Although the invention has been described with reference to its application to a particular type of mixing device, it is to be understood that other types of mixing devices can be employed. Further, the pressure between the elastic inner casing 16 and the rigid outer casing 15 may be controlled through more than a single valved port.

What is claimed is:
1. In a mixing device having at least one mixing vessel with a side wall of circular cross-section and a bottom, at least one mixing element disposed in said vessel with the longitudinal axis of said element extending parallel to said side wall, means mounting said ele- ment for revolving about the longitudinal axis of the vessel in close proximity to said side wall, and drive means for effecting said revolving of said mixing element; said side wall comprising a closed rigid outer casing and a closed elastic inner casing joined together in a fluid-tight manner at their upper and lower edges to define a space therebetween, and valve means carried by said side wall and communicating with said space so that the pressure in said space may be varied through said valve means to cause the movement of said elastic inner casing toward and away from said mixing element.

2. A mixing device according to claim 1; wherein said means mounting the mixing element further permits rotation of said element about it own longitudinal axis, and said drive means causes rotation of said mixing element about its longitudinal axis simultaneously with the revolving of the mixing element about the longitudinal axis of the mixing vessel.

3. A mixing device according to claim 1; wherein said side wall is in the form of a frustum of a downwardly tapering cone, and said means mounting the mixing element includes a radial arm at the top of said vessel mounted for rotation about the axis of said cone, bearing means carried by said arm and rotatably supporting said mixing element at the upper end of the latter, and bearing means carried by said bottom of the vessel concentric with the axis of said cone and rotatably supporting the lower end of said mixing element so that the latter is able to rotate about its own longitudinal axis simultaneously with the revolving of the mixing element about said axis of the vessel; and wherein said drive means causes rotation of said mixing element about its longitudinal axis simultaneously with said revolving of the element about said axis of the vessel.

4. A mixing device according to claim 1; wherein said outer rigid casing has a radially outward offset portion extending circumferentially about said side wall over a substantial part of the height of said mixing vessel, and said valve means open into said offset portion to communicate with said space defined thereby.

References Cited by the Examiner

UNITED STATES PATENTS 2,967,695    1/1961    Nauta _____ 259—102

FOREIGN PATENTS 585,331    11/1958    Italy.
78,793    8/1955    Netherlands.

R. W. JENKINS, *Examiner.*

WALTER A. SCHEEL, *Primary Examiner.*